Figures 1, 2:
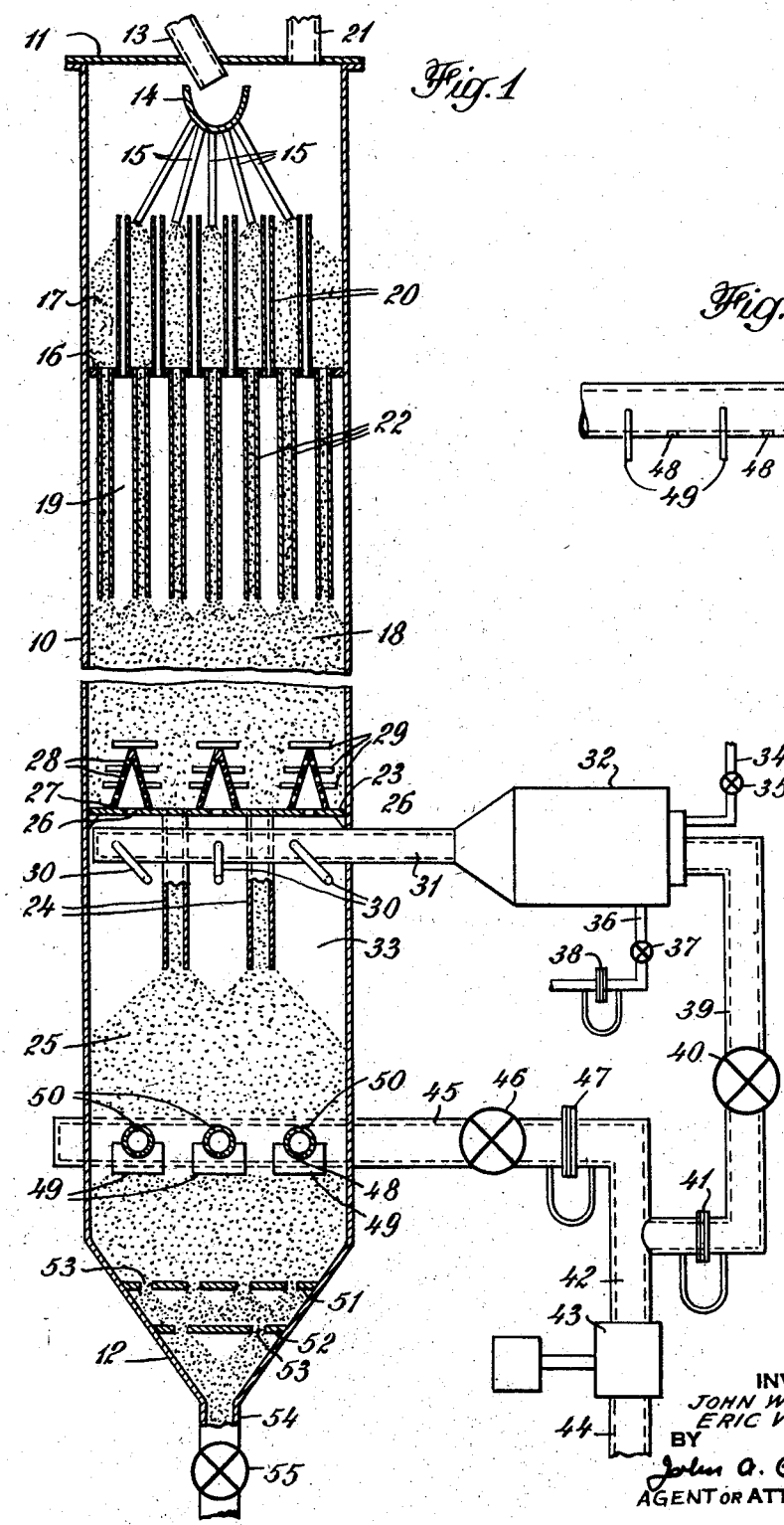

Patented May 23, 1950

2,509,014

UNITED STATES PATENT OFFICE 2,509,014

METHOD AND APPARATUS FOR HEAT-TREATING PARTICLE FORM SOLIDS

John W. Payne, Woodbury, and Eric V. Bergstrom, Short Hills, N. J., assignors to Socony-Vacuum Oil Company, Incorporated, a corporation of New York Application March 4, 1947, Serial No. 732,305

14 Claims. (Cl. 252—410)

This application is a continuation in part of application Serial Number 571,308 filed in the United States Patent Office January 4, 1945, abandoned, in the name of the same applicants.

This invention has to do with a method and apparatus for heat treating particle form solid adsorbent materials which may be by nature useful for a variety of purposes and particularly for heat treating particle form solid adsorbent materials of the type used for adsorption and catalytic conversion and treating operations. Typical of such catalytic conversion operations is the catalytic cracking conversion of hydrocarbons, it being well known that hydrocarbon gas oils boiling within the approximate range of 450° F. to 750° F. may be converted to gasoline and other products when contacted with certain solid adsorbent materials at temperatures of the order of 800° F. and higher and pressures generally above atmospheric. Carbonaceous contaminants may be deposited upon the adsorbent material during the hydrocarbon conversion causing a gradual decline in the catalytic activity of the solid material and requiring periodic regeneration thereof. Such regeneration is generally accomplished by subjecting the solid material to the action of a combustion supporting gas acting to burn off the contaminant therefrom and thereby heating the solid material to temperatures of the order of 900° F. to 1300° F.

The particle form solid adsorbent materials used for such processes may partake of the nature of natural and treated clays or of certain synthetic associations of silica, alumina, or silica and alumina to which other constituents may be added such as certain metallic oxides. An important material of the latter type is the recently developed spherical shaped, gel type "bead catalyst."

Before the use of freshly prepared solid adsorbent materials for such processes as the above, it has been found necessary to subject them to a heat treatment. Such heat treatment serves several purposes, first, it hardens the solid material particles so as to render them less susceptible to crushing and breakage in use. Second, it stabilizes the catalytic activity of the solid material as regards the hydrocarbon conversion reaction and the amount of contaminant deposition resulting therefrom. Third, it renders the solid material less susceptible to drop in catalytic activity due to the high temperatures involved in the regeneration operation. Such heat treatment involves maintaining the freshly prepared, dried particle form solid material at temperatures of the order of 1000° F. to 1600° F. generally in the presence of controlled partial pressures of steam for definite periods of time. Certain types of particle form solid adsorbents such as the gel type spherical bead catalyst tend to undergo considerable particle size degradation by cracking or bursting of the solid particle if the particles contain large amounts of moisture and are subjected to rapid changes in temperature. Heretofore all attempts to heat treat such materials on a practical commercial scale have failed due to cracking or breakage of most of the solid particles. It was found that most of the particle cracking and breakage occurs during the preheating period at those temperature levels, generally within the range 300° F. to 700° F. when the last 10% to 15% moisture is removed from the solid particles. It was discovered that the cracking and breakage could be substantially eliminated by very delicate control of the rate of solid preheating during this stage of the solid preheat. This invention is specifically directed to a method for heat treating such easily cracked solid material particles which method involves proper control of the rate and amount of preheat during this critical stage of the solid heating. In its broader aspects the invention is directed to a method and apparatus which may be conveniently used for heat treating any type of particle form solid adsorbent material.

A continuous method for heat treating particle form solid materials is the subject of the copending application Serial Number 561,478 filed in the United States Patent Office on November 1, 1944, now U. S. 2,477,019, in which application one of the present applicants is also an applicant. In a simple form, the method of that application consists of passing the particle form solid material as a substantially compact column downwardly through a suitable vessel while introducing a large volume of cold gas into the column near its lower end and passing it through said column countercurrently to the direction of solid material flow thereby cooling the solid material leaving the lower end of said vessel and heating the solid material within the upper end of said vessel to the desired treating temperature. At the same time a smaller quantity of preheated gas is admitted to said column at a level somewhat above the level of cold gas introduction and passed upwardly through said column to compensate heat required for moisture evaporation or any heat losses from the system involved in the operation. In its preferred form the present invention involves certain modifications of method and apparatus of the general method of the above application to better adapt the method and apparatus for carefully controlled solid preheating and for more uniform gas solid contact in the cooling and heat treating zones, and more uniform heat treating and cooling of the solid material. In its broader aspects the method of the instant invention is not limited to the general method of the aforementioned application but may be applied to other forms of continuous operation and to batch type operations conducted within a single zone.

A major object of this invention is the provision of a method and apparatus of the continuous type for heating a particle form solid adsorbent material to a predetermined treating temperature, maintaining it uniformly near said temperature for a fixed period of time and finally cooling said solid material.

A specific object is the provision of a method and apparatus for conducting such a process as above described without appreciable cracking or breaking of the solid particles.

Another specific object is the provision of a method and apparatus for heat treating a particle form solid adsorbent material at elevated temperatures in the presence of a heat treating gas which method and apparatus permit a process of high thermal efficiency and permit very uniform contacting of the solid material with the heat treating gas.

Another important object is the provision of a method and apparatus for heat treating "bead catalyst."

These and other objects of this invention will become apparent from the following discussion.

The invention may be more readily understood by reference to the attached drawings of which Figure 1 is an elevational view, partially in section, of a preferred form of the apparatus for conducting solid heat treating operations and Figure 2 shows a section in detail of one of the gas distributors used in said apparatus. Both of these drawings are highly diagrammatic in form.

In Figure 1, 10 represents the shell of a vertical vessel closed on its upper end by plate 11 and on its lower end by converging section 12. The vessel may be of any desired cross-sectional shape, although circular or rectangular cross-section are preferred. The vessel may be left open at its upper end if escape of the heat treating gas directly to the atmosphere is unobjectionable. A conduit 13 is provided at the upper end of vessel 10 for inlet of untreated solid material. The solid material is fed into a trough 14, supported by members (not shown) from which trough several distributor pipes 15 depend for uniform distribution of solid material across the vessel cross-section. Constructions other than that shown may be substituted for solid material distributors, if desired. A partition 16 is supported across the upper section of the vessel to provide a surge chamber 17. A plurality of conduits 22 depend from partition 16 and terminate a fixed distance therebelow for flow of solid material to the heat treating zone 18 of the vessel and a plurality of conduits 20 are connected through the partition 16 and extend upwardly therefrom to a level above that of the lower ends of distributor pipes 15. The conduits 22 are so spaced as to provide a gas space 19 therebetween for gas flow. A gas outlet duct 21 is provided in the top plate 11 of the vessel. The arrangement described provides an effective indirect heat transfer type of solid preheater within the upper section of the vessel. A second partition 23 is provided across the lower section of the vessel a substantial distance above the bottom thereof. A plurality of spaced rows of conduits 24 depend from said partition for flow of solid from the heat treating zone 18 to the cooling zone 25, thereby providing gas mixing chamber 33 between said zones. A plurality of spaced rows of holes 26 are provided through the partition 23 between said rows of conduits 24. Inverted angle shaped troughs 27 extend across the vessel in a direction perpendicular to the plane of the drawing so as to cover the rows of holes 26. A plurality of holes 28 are provided through the sides of these troughs to permit gas passage into the heat treating zone, and horizontally extending fins 29 are attached along the lengths of the troughs 27 to deflect the solid material flow away from the holes 28. A gas inlet manifold 31 extends into chamber 33 and a plurality of distributor pipes are attached to manifold 31 inside chamber 33 for gas introduction in such a way as to permit thorough mixing with gas rising to said chamber from cooling zone 25 therebelow. The gas inlet manifold 31 in turn connects into an externally located line type gas heater 32. Fuel inlet pipe 34 having control valve 35 thereon, and a steam inlet pipe 36 having control valve 37 and flow meter 38 thereon connect into the heater 32. A gas conduit 39 having flow control valve 40 and flow meter 41 thereon also connects into the heater and connects on its other end through conduit 42 to a gas compressor or blower 43. A conduit 44 is connected to the suction side of the blower or compressor 43. A gas inlet manifold 45 having flow control valve 46 and flow indicator 47 thereon also connects through pipe 42 to the blower or compressor 43. Gas distributor pipes 50 extend from the manifold 45 into and across the lower section of vessel 10 near the lower end of the cooling zone 25. These pipes are closed on their far ends and have holes 48 through their undersides at spaced intervals for gas distribution. Baffle plates 49 depend from the lower sections of the pipes at intervals between said holes. These plates extend a sufficient distance below the pipes to effectively block the gas space naturally formed during solid material flow which gas space extends along the underside of the pipes 50. The construction is clearly shown in Figure 2, wherein is shown a section of one of the pipes 50 near its closed end, the holes 48 in the underside thereof and the baffle plates 49. It will be understood that particular manifolding of the pipes 50 and of the inlet pipes 30 to gas chamber 33 is highly diagrammatic in form as is also the external gas manifolding and the method for heating the gas, and that certain structural improvements which will readily suggest themselves to those skilled in the art are considered as included within the scope of this invention. Partitions 51 and 52 spaced vertically apart are supported across the converging drain section 12 of the vessel. Orifices 53 through the partitions are suitably distributed so as to cause the division of solid material flow into a plurality of streams proportionately distributed with respect to the vessel cross-section, which streams are then gradually and proportionately recombined into a single discharge stream, discharging through outlet conduit 54 connected to the lower end of section 12. The partition and orifice arrangement thus serves to provide uniform withdrawal of solid material from the entire cross-section of the column thereof within the vessel. Any other construction properly designed to serve the same purpose may be alternately substituted for the arrangement shown.

In an exemplary operation, untreated particle form solid adsorbent material at a temperature within the range atmospheric to about 400° F. is introduced through conduit 13 into the upper end of the treating vessel 10. The solid material is distributed from trough 14 through pipes 15 uniformly over the surface of the bed of said material in the surge zone 17. It is subjected to preheating within said surge zone by indirect contact with the partially cooled heat treating gas passing upwardly through conduits 20. It then passes downwardly through conduits 22 while being further heated by indirect heat exchange with the hot heat treating gas passing upwardly through the gas space 19. The number and length of the conduits 22 and 20 are such as to provide a predetermined amount of preheating at a relatively slow rate to a temperature sufficiently high to insure substantially complete removal of moisture from the solid material. The solid material then passes downwardly as a substantially compact column through the heat treating zone 10, in a short upper section of which it is rapidly heated to about the predetermined heat treating temperature which is usually within the range 1000° F. to 1600° F. by direct contact with hot heat treating gas passing upwardly through the solid material column. It is maintained near said heat treating temperature throughout the major and remaining part of the heat treating zone also by contact with said gas flow. The solid material then passes through conduits 24 into the cooling zone 25 wherein it is cooled to a predetermined outlet temperature by direct contact with a relatively low temperature gas passing upwardly through zone 25. The cooled solid material then passes through the orifices in the flow distribution partitions 51 and 52 and is withdrawn through conduit 54. The rate of solid flow is controlled by valve 55 so as to maintain the passages for solid material flow within the vessel substantially filled and so as to control the residence period of the solid material within the heat treating zone.

A controlled amount of inert gas, such as air, at temperatures generally within the range atmospheric to about 300° F. passes from compressor or blower 43 through conduits 42 and 45 into the distributor pipes 50 from which it passes through holes 48 into the column of solid material. It then passes upwardly through the solid material in cooling zone 25, thereby cooling the solid material and being preheated itself. The gas eventually rises into the mixing chamber 33 wherein it is thoroughly mixed with a preheated gas, such as air, which is introduced through inlet pipes 30. The gas fed to the pipes 30 may be air from blower 43, which air passes through conduits 42 and 39 to preheater 32 and then into manifold 31. The air is generally heated to a temperature somewhat above the predetermined solid heat treating temperature, the inlet rate and temperature being controlled so as to substantially balance the net heat removal from the entire heat treating apparatus. The mixed hot gas then passes through holes 26 in partition 23 and is distributed by inverted troughs 27 uniformly across the cross-section of the solid column in the lower end of the heat treating zone 18. It then passes upwardly through the solid material in the heat treating zone, maintaining the solid material near the predetermined heat treating temperature throughout most of the zone and rapidly adjusting it to about said heat treating temperature in a short upper section of said zone 18. The hot gas then passes upwardly through the gas space 19 so as to slowly heat the entering solid material by indirect heat transfer through pipes 22 through the critical stage of the solid preheating operation. The gas then passes upwardly through conduits 20 still in indirect heat transfer relationship with the solid material and finally is withdrawn from the top of the vessel through conduit 21 at a temperature of the order of 300° F. to 400° F.

It will be noted that the conduits 20 serve the dual purpose of providing a means for uniform withdrawal of gas from the upper end of gas space 19 and of providing part of the surface for indirect heat transfer between gas and solid material. The above arrangement for preheating the solid material at a carefully controlled rate is a preferred form of the apparatus, but other less preferable arrangements may be substituted within the scope of this invention. Thus, for example, means may be provided for directly removing the gas from the upper end of zone 18 and the partition 16 and conduits 20 and 22 eliminated. Heat transfer tubes may then be provided within the upper section of the vessel, through which the hot gas from the heat treating zone or other heat transfer fluid may be passed to accomplish the controlled preheating operation.

In any case the amount of surface so provided for indirect heat transfer should be such as to provide a rate of solid preheat within the range of about 75° F. to 150° F. increase per hour and broadly below about 60° F. per minute and to permit preheating of said solid material to a temperature sufficiently high for substantially complete removal of moisture from the solid material. For synthetic gel catalysts such as bead catalyst, the solid material should be preheated to a temperature within the range 200° F. to 600° F. above its inlet temperature depending upon its inlet temperature. Thus the inlet temperature of the solid material to the heat treating zone should be of the order of 500° F. to 700° F. It should be understood that the expression "substantially complete removal of moisture" as used herein in describing and claiming this invention is intended to mean substantially complete removal of that loosely bound moisture on the solid material which upon heating of the solid material is released at a rate so high as to result in cracking or breaking of the solid particles. As pointed out hereinabove for gel catalysts this loosely bound moisture is substantially completely removed at temperatures of the order of 500–700° F. After substantially complete removal of this loosely bound moisture many adsorbents may still contain small amounts of strongly bound moisture, probably chemically bound, which may be released only on further increase in the adsorbent temperature and which is not released at a rate sufficiently great to cause substantial breaking or cracking of the solid particles.

The following Table I presents data on catalyst particle cracking and breakage occurring in heating a typical spherical silica-alumina gel catalyst at various rates.

*Table I*

| Catalyst Temperatures | | Catalyst Moisture Content Per Cent by Wgt. of Catalyst | | Rate of Heating | Catalyst Broken and Cracked during Heating Per Cent of original |
|---|---|---|---|---|---|
| Initial | After Heating | Initial | After Heating | Temp. Increase | |
| °F. | °F. | | | °F. per Min. | |
| 250 | 600 | 12 | 2.9 | 7.1 | 0 |
| 250 | 600 | 12 | 2.9 | 26.7 | 0 |
| 250 | 600 | 12 | 2.9 | 53.4 | 0 |
| 250 | 600 | 12 | 2.9 | 70.0 | 65 |
| 250 | 600 | 12 | 2.9 | 115 | 50 |
| 250 | 600 | 12 | 2.9 | above 500 | 100 |

Table I shows that when a gel type catalyst of this type exists at a temperature of the order of 250° F. it will contain about 12% by weight moisture which is reduced to about 2.9% moisture on heating to 600° F. When the catalyst was heated from 250° F. to 600° F. at a rate of 53.4° F. per minute and at any lower rate no cracking and breakage of the catalyst particles occurred. When the rate of heating was 70° F. per minute about 65% of the catalyst particles were cracked and broken. The amount of moisture removed between 250° F. and 600° F. in this case may be considered the loosely bound moisture referred to hereinabove.

In Table II there is shown data on heating the same catalyst at various rates, starting at an initial temperature of 80° F.

*Table II*

| Catalyst Temperature | | Catalyst Moisture Content Per Cent by Wgt. of Catalyst | | Rate of Heating | Catalyst Broken and Cracked during Heating Per Cent of original |
|---|---|---|---|---|---|
| Initial | After Heating | Initial | After Heating | Temp. Increase | |
| °F. | °F. | | | °F. per Min. | |
| 80 | 600 | 12 | 2.9 | 3.0 | 0 |
| 80 | 600 | 12 | 2.9 | 16.0 | 30 |
| 80 | 600 | 12 | 2.9 | 32.0 | 60 |
| 80 | 600 | 12 | 2.9 | above 500 | 100 |

It will be noted that when this catalyst was heated from 80° F. to 600° F. the permissible rate of heating (3° F./minute maximum) is much lower than in the case of catalyst initially existing at 250° F. While the reason for this is not fully understood, it is clear that it is not because of any difference in initial moisture content as comparison of the data in Tables I and II clearly show. For true gel catalysts we prefer to conduct the initial heating period at rates of the order of 75° F. to 150° F. increase per hour but within the broader scope of this invention we contemplate heating catalysts at a rate up to about 60° F. per minute during the initial heating period.

In Table III there is shown data on the amount of moisture which should be removed and the corresponding temperature before the catalyst may be heated rapidly. This data was obtained on a catalyst similar to that involved in Tables I and II.

*Table III*

| Catalyst Temperature | | Catalyst Moisture Content Per Cent by Wgt. of Catalyst | | Rate of Heating | Catalyst Broken and Cracked during Heating Per Cent of original |
|---|---|---|---|---|---|
| Initial | After Heating | Initial | After Heating | Temp. Increase | |
| °F. | °F. | | | °F. per Min. | |
| 400 | 1,050 | 4.5 | 0.0 | above 500 | 100 |
| 500 | 1,050 | 3.8 | 0.0 | above 500 | 30 |
| 600 | 1,050 | 2.9 | 0.0 | above 500 | 0 |

It will be seen from Table III that for a gel catalyst of this type the loosely bound moisture which would cause breakage of the catalyst particles on rapid heating is not substantially completely removed until a temperature approaching about 600° F. is reached. The residual 2.9% moisture on the catalyst at 600° F. may be considered as tightly bound moisture which is not released at a fast enough rate to cause catalyst particle breakage even on very rapid heating of the catalyst. The moisture content data given in Tables I–III inclusive is on the basis of an assumed bone dry catalyst at 1050° F. Actually the catalyst at 1050° F. may contain a small amount of tightly bound moisture. The catalyst involved in the data of Tables I–III consisted of spheres of about .14 inch average diameter prepared by mixing of a basic solution of sodium silicate with an acidic solution of aluminum sulfate in a ratio to give about 13 parts by weight silica to 1 part by weight of alumina. It will be understood that the maximum required temperature to which the catalyst must be slowly heated before it may be very rapidly heated on up to the desired heat treating temperature will vary somewhat from that shown in Table III depending upon the particular catalyst involved. In general this critical temperature will be within the range about 500° F.–700° F. for true gel catalysts and within the range about 300–700° F. for catalysts of other types which are susceptible to being cracked and broken by rapid initial heating.

The method of mixing the preheated gas supplied to balance temperature loss from the system, with the gas from the cooling zone in the absence of the solid material is of considerable importance. Unless such a gas mixing chamber is provided, the two converging gas streams which may be at substantially different temperatures will not be uniformly mixed, and uneven temperatures across the column of solid material in the heat treating zone will result. The structure shown for providing a gas mixing chamber and the structure for uniformly introducing mixed gas into the heat treating zone are believed to be novel and are part of the preferred form of this invention. The invention in its broader scope is intended also to cover certain modified structures which may be adapted to accomplish the same purpose although less satisfactorily.

The construction shown for gas distribution pipes 50 is also part of the preferred form of this invention. The provision of baffle plates 49, as shown, prevents the channeling of gas through the gas spaces directly under the pipes 50 to localized areas of the cooling zone cross-section and thereby promotes even distribution of cooling gas across the entire cooling zone cross-section and uniform cooling of the solid material. The holes 48 in the pipes 50 should be of such size as to cause a pressure drop due to gas flow therethrough high enough to insure substantially equal discharge of gas through each hole. The combined provision of cooling gas distribution, as shown, and uniformly spaced conduits 24 for confined passage of solid material through the gas mixing chamber between heat treating and cooling zones serves to substantially eliminate any tendency for channeling of gas and solid material flow through certain localized areas of the vessel cross-section which channeling might otherwise arise first in the cooling section and extend upwardly through the heat treating zone. Such channeling would result in considerable lack of uniformity in the heat treatment of the solid material. It has been found generally preferable and satisfactory to limit the length of the cooling zone 25 below about 3 feet. Broadly the ratio of the length of the cooling zone to its diameter should preferably be of the order of 25% to 35%.

The gas introduced into the cooling zone through pipes 50 and into the mixing zone through pipes 30 may be inert gas of substantially the same type as shown hereinabove, or the manifolding may be altered to permit introduction of different gases at the two levels. Thus flue gas instead of air would be introduced through pipes 30. Moreover, if desired, the apparatus may be modified to permit external mixing of the gases.

It is common practice in operations involving heat treatment of solid adsorbent materials to contact said solid materials with controlled partial pressures of steam under the heat treating temperature conditions. Such steam contact greatly accelerates the heat treating operation. In the apparatus shown, controlled quantities of steam may be admitted through pipe 34 into the line burner 32 and conducted along with the preheated inert gas entering through conduit 39, through the line heater and manifold 31 into the mixing chamber 33 through pipes 30. The amount of steam thus admitted should be such that the gas flowing upwardly through the heat treating zone contains from 1% to 50% by volume steam, depending upon the solid adsorbent being treated and the desired severity of the treatment.

It should be noted that the term inert gas as used herein in describing and claiming this invention is used in the sense of a gas which is substantially chemically inactive with relation to the solid material being treated.

It will be apparent that according to the broad method of this invention, the preheating, heat treating and cooling zones may be, if desired, provided in three superposed, separate, communicating vessels, rather than in a single vessel as shown; or the preheating zone may be in a separate vessel and the heat treating and cooling zones within the same vessel.

As an example of the application of this invention, the preferred form substantially as shown in Figure 1 is now used commercially for the heat treatment of gel type bead catalysts used for a catalytic hydrocarbon conversion process. The bead catalyst is prepared by nozzle mixing a basic solution of sodium silicate with an acidic solution of aluminum sulfate in the ratio to give about 13 parts by weight of silica to 1 part by weight of alumina. The resulting sol stream is broken up and dropped through a column of oil in such a manner as to form sol spheres which gel during passage through the oil column. The spherical gel beads are hot water treated, base exchanged with aluminum sulfate, washed and then dried in a continuous belt type drying oven while being contacted with superheated steam at a temperature of about 300° F. The dried beads pass from the driers at about 300° F. and still contain about 5% to 15% by weight moisture. The bead catalyst is introduced directly without cooling into a heat treating apparatus of the type shown in Figure 1. It is subjected to preheating by indirect heat transfer at the rate of about 100° F. per hour. The catalyst leaving the indirect heat transfer preheating zone is at a temperature of about 550° F. It is then rapidly heated by direct contact with the heat treating gas in the upper section of the heat treating zone to a temperature of about 1300° F. and maintained near said temperature throughout a major portion of the heat treating zone.

The treated catalyst then passes through the cooling zone wherein it is cooled to about 400° F. by direct contact with a stream of air introduced at atmospheric pressure. The cooled catalyst flows from the apparatus at a rate throttled so as to control its residence time in the heat treating zone to about 10 hours. A second stream of air preheated to about 1525° F. is introduced into the air mixing chamber and the mixed air passes upwardly through the heat treating zone. A controlled amount of steam is introduced along with the preheated air so that the gas passing through the heat treating zone consists of about 10% volume steam. The volumetric ratio of preheated air introduced to the mixing chamber to atmospheric air introduced to the cooling zone is of the order of 5 to 4. The heat treating gas passes from the top of the apparatus at about 400° F. after indirect heat exchange with the solid material in the preheating zone. The total gas throughput amounts to about 20 cubic feet (standard) per pound of catalyst treated, which air is passed through the apparatus at a pressure drop of about 30 inches of water. From the above example it will be apparent that the method and apparatus of this invention provides a heat treating process of very high thermal efficiency and having a very low operating cost. All previous attempts to heat treat the bead catalyst in conventional apparatus were totally unsuccessful due to the loss of about 50% of the catalyst due to breakage or cracking. By the method and apparatus described hereinabove, only about 5% loss of beads was encountered.

It will be understood that the specific form of apparatus and the specific operation conditions presented in the description of this invention are merely exemplary and are in no way intended to limit the scope of this invention except as it may be limited in the following claims.

We claim:

1. A method for heat treating a particle form solid adsorbent material without substantial cracking of said solid material particles which method comprises: maintaining a substantially compact, vertical, confined column of said particle form solid material, withdrawing treated solid material from the lower end of said column at a controlled rate, supplying untreated solid material uniformly across the cross-section of the upper end of said column, passing an inert gas at substantially atmospheric temperature through a vertical section of the column near the lower end thereof in direct contact with the solid material and countercurrently to the direction of flow thereof to cool the treated solid material, withdrawing said gas from contact with the solid material and mixing it out of contact with said solid material with a second stream of substantially inert gas externally preheated to a set temperature above a predetermined heat treating temperature within the range about 1000–1600° F., passing the mixed hot gas through said column above said cooling section in direct contact with said solid material to maintain said solid material near said predetermined heat treating temperature throughout a major portion of the column length and to adjust the temperature of the entering solid material and withdrawing the heat treating gas from the upper end of said column and passing it in such controlled indirect heat transfer relationship with the entering untreated solid material as to preheat said solid material to a temperature sufficiently high for removal of substantially all moisture from said solid material, said temperature being within the range of about 500° to 700° F., the rate of heating being below the maximum critical rate at which the solid particles would be substantially cracked, which rate depends upon the temperature of the solid material supplied to said column and is below about 3° F. per minute and below about 60° F. per minute for solid material supply temperatures of about 80° F. and 250° F. respectively.

2. A method for heat treating a particle form solid gel type bead catalyst initially existing at a temperature of at least about 250° F. at controlled elevated temperatures which method comprises: passing said catalyst as a substantially compact mass of downwardly moving particles serially through a preheating zone wherein it is heated to a temperature sufficient for substantially complete moisture removal and within the range of 500° F. to 700° F., then through a treating zone wherein it is further heated to a predetermined heat treating temperature within the range of 1000° F.–1600° F. and maintained near said temperature for a period within the range of 2 to 20 hours, then through a cooling zone wherein it is cooled to a set outlet temperature; introducing a substantially inert gas at substantially atmospheric temperature into said cooling zone and passing it in direct contact with the catalyst therein and countercurrent to the direction of catalyst flow, the rate of said gas introduction being such as to cool said solid material to said set outlet temperature while substantially heating said gas, passing the heated gas from said cooling zone into a substantially catalyst free chamber between said cooling zone and the heat treating zone, externally preheating a second stream of gas and mixing it with said first gas at a controlled rate in said catalyst free chamber, the temperature and rate of introduction of said second gas stream being such as will substantially balance the heat removal from the system of three zones, passing the mixed gas in direct contact with and countercurrent to the flow of the catalyst in said heat treating zone to maintain the temperature of said catalyst near said predetermined heat treating temperature and to adjust the entering catalyst to said temperature, and passing the hot gas from said heat treating zone into said preheating zone in controlled indirect heat transfer relationship with the catalyst to accomplish the preheating thereof, said controlled heat treating relationship being such that the rate of catalyst preheat is maintained below about 60° F. increase per minute.

3. A method of operation according to claim 2 characterized in that the mixed gas passed through said heat treating zone contains an amount of steam within the range of 1%–50% by volume.

4. A method for heat treating a particle form solid gel type bead catalyst at controlled elevated temperatures which method comprises: passing said catalyst as a substantially compact mass of downwardly moving particles serially through a preheating zone wherein it is heated to a temperature sufficient for substantially complete moisture removal and within the range of 500° F. to 700° F., then through a treating zone wherein it is further heated to a predetermined heat treating temperature within the range of 1000° F.–1600° F. and maintained near said temperature for a period within the range of 2 to 20 hours, then through a cooling zone wherein it is cooled to a set outlet temperature; introducing a substantially inert gas at substantially atmospheric temperature into said cooling zone and passing it in direct contact with the catalyst therein and countercurrent to the direction of catalyst flow, the rate of said gas introduction being such as to cool said solid material to said set outlet temperature while substantially heating said gas, passing the heated gas from said cooling zone into a substantially catalyst free chamber between said cooling zone and the heat treating zone, externally preheating a second stream of gas and mixing it with said first gas at a controlled rate in said catalyst free chamber, the temperature and rate of introduction of said second gas stream being such as will substantially balance the heat removal from the system of three zones, passing the mixed gas in direct contact with and countercurrent to the flow of the catalyst in said heat treating zone to maintain the temperature of said catalyst near said predetermined heat treating temperature and to adjust the entering catalyst to said temperature, and passing the hot gas from said heat treating zone into said preheating zone in controlled indirect heat transfer relationship with the catalyst to accomplish the preheating thereof, said controlled heat treating relationship being such that the rate of catalyst preheat is maintained within the range of 75° F.–150° F. increase per hour.

5. A method for heat treating a particle form solid gel type bead catalyst at controlled elevated temperatures without substantial cracking of the bead particles which method comprises: introducing said untreated bead catalyst to the upper end of an elongated confining vessel at a temperature of about 250° F. to 350° F., preheating said catalyst to about 500° F. to 600° F. while flowing through the upper section of said vessel by indirect heat transfer with effluent heat treating gas, controlling the rate of said heating below about 60° F. increase in catalyst temperature per minute, further preheating said catalyst to and maintaining it near a heat treating temperature of about 1300° F. by direct contact with hot heat treating gas while passing said catalyst downwardly through the intermediate section of said vessel, cooling the heat treated catalyst to about 300° F. to 400° F. by direct contact with atmospheric air while passing it through the lower section of said vessel, withdrawing the cooled catalyst uniformly from the entire cross-section of the lower end of said vessel at a rate so throttled as to maintain the catalyst flow passages within said vessel substantially filled with a compact mass of catalyst beads and as to control the residence period of the catalyst in the heat treating section to about 10 hours, baffling the catalyst flow between said intermediate and lower section of said vessel so as to provide a catalyst excluded gas space therebetween, introducing atmospheric air into said lower section to accomplish the catalyst cooling and passing it upwardly through the catalyst and into said gas space, introducing preheated air containing a fixed percentage of steam at a temperature of about 1500° F. into said gas space so as to mix with said first air stream, passing the mixed streams as the heat treating gas upwardly through the solid material within said intermediate section, passing the gas from said intermediate section in indirect heat exchange relationship with the catalyst in said upper section to accomplish said preheating, and withdrawing the gas from the upper end of said vessel; wherein the rate of introduction of said preheated air stream is controlled to substantially balance the heat removed from said vessel and the percentage of steam in said stream is such as to provide about 10% by volume steam in the mixed heat treating gas.

6. The method for uniformly heat treating particle form solid adsorbent materials without substantial breakage of the solid particles which method comprises: maintaining a substantially compact confined column of said particle form solid adsorbent material, uniformly replenishing the upper end of said column with untreated solid, withdrawing treated solid material from the lower end thereof while baffling the solid flow near the lower end of said column to provide uniform withdrawal from the entire cross-section of said column, passing substantially atmospheric air upwardly through a short lower section of said column to cool said solid, baffling said column above said cooling section to provide a substantial gas space between said lower section and the column thereabove into which gas space said cooling air may flow from said lower section, preheating a second stream of air containing a controlled percentage of steam and introducing said preheated air into said gas space to thoroughly mix with said air from said cooling section, uniformly distributing the mixed gas into the column directly above said gas space and passing it upwardly through a major length of said column in direct contact with said solid material to control said solid throughout a major length of said column near a set heat treating temperature within the range 1000° F. to 1600° F., withdrawing said hot gas from direct contact with said solid near but below the upper end of said column and passing said gas in controlled indirect heat transfer relationship with the solid material in a relatively short upper section of said column to preheat said solid.

7. A method of accomplishing uniform treatment of a particle form solid contact material with gasiform materials at elevated temperatures which comprises: passing said solid material as a substantially compact column of gravitating particles downwardly through a confined zone wherein it is gradually heated to an elevated treating temperature and then maintained under treating conditions during a major portion of its passage downwardly through said zone, passing a cooling gas upwardly through a short lower section of said column to cool said solid material, diverting the solid flow in said column above said cooling section to provide a substantial gas space between said cooling section and the column thereabove into which gas space said cooling gas may flow from said lower section, preheating a second stream of gas to a temperature above said treating temperature and introducing it into said gas space to thoroughly mix with said gas from said cooling section, uniformly distributing the mixed gas into the column at a level immediately above said gas space and passing it upwardly through the column to effect said treatment.

8. In an apparatus for conducting uniform heat treatment of particle form solid adsorbent materials: a substantially vertical vessel, inlet means for solid material near the upper end thereof, means to withdraw solid from the lower end thereof at a controlled throttled rate so as to maintain said vessel substantially filled with solid material, members defining a gas chamber extending substantially entirely across a lower portion of said vessel a substantial distance above the lower end thereof and in free communication with the section of said vessel therebelow, said members also defining confined passages for solid material flow through said gas chamber from the section of the vessel above said gas chamber to the section therebelow, gas inlet means to said vessel near the lower end thereof a spaced distance below the lower extremity of said members defining said passages for solid flow, a second gas inlet means connecting into said vessel and opening directly into said gas chamber, a plurality of gas distributors mounted close above said members defining said gas chamber and means communicating said distributors with said gas chamber, said distributors being uniformly spaced apart entirely across said vessel, and gas outlet means connecting into the upper section of said vessel.

9. An apparatus according to claim 8 characterized by the further improvement of an external gas preheater, conduit means communicating said preheater with said second gas inlet means and means to supply gas to be heated to said preheater.

10. An apparatus according to claim 8 characterized in that said means to admit gas to said vessel below the level of said gas chamber comprises: a plurality of spaced pipes extending across said vessel, each of said pipes closed on one end and having a plurality of holes spaced at intervals along the underside thereof, baffle plates depending from each of said pipes at spaced intervals in such a way as to prevent the channeling of gas along the undersides of said pipes and manifolding to introduce gas into the open ends of said pipes.

11. In an apparatus for conducting uniform heat treatment of particle form solid adsorbent materials: a substantially vertical, elongated vessel adapted for confining a column of said solid material, means to admit said solid material near the upper end thereof, means to withdraw solid material from the lower end thereof at a throttled rate, a partition supported across said vessel within the lower section thereof to divide said vessel into a long upper chamber and a short lower chamber, conduits depending from said partition for flow of solid material from the upper chamber to the lower chamber and to provide a gas chamber therebetween, means to admit gas into said vessel a spaced distance below the lower ends of said conduits, means to admit gas to said vessel at the level of said gas chamber, means to distribute gas from said gas space uniformly across the cross-section of the vessel directly above said partition and means to withdraw gas from the upper section of said vessel.

12. In an apparatus for conducting uniform heat treatment of particle form solid adsorbent materials: a substantially vertical, elongated vessel adapted for confining a column of said solid material, means to admit said solid material near the upper end thereof, means to withdraw solid material from the lower end thereof at a throttled rate, a partition supported across said vessel within the lower section thereof to divide said vessel into a long upper chamber and a short chamber, said partition having a plurality of uniformly spaced rows of openings therethrough, a plurality of uniformly spaced rows of conduits depending from said partition for passage of said solid material between said chambers and to provide a gas space therebetween, said rows of conduits depending from said partition between said rows of openings, a plurality of inverted troughs extending horizontally above said partition in such a way as to cover said openings, said troughs having openings in their sides for passage of gas, horizontally extending fins extending along the sides of said troughs above said openings therein to deflect the flow of solid material away from said openings, means to admit gas to said vessel a spaced distance below the lower ends of said conduits which depend from said partition, means to admit gas to said vessel at a level intermediate the levels of the upper and lower ends of said depending conduits in such a way as to be thoroughly mixed with the gas rising into said gas space from the chamber therebelow and means to withdraw gas from the upper section of said vessel.

13. An apparatus for conducting uniform heat treating of particle form solid adsorbent materials without substantial breakage of the solid particles which apparatus comprises: a substantially vertical, elongated vessel, means to admit said solid material to the upper end of said vessel, means to withdraw solid material from the lower end of said vessel at a throttled rate so as to maintain the passages for solid flow therein substantially filled with particle form solid material, a partition supported across said vessel within the upper section thereof and spaced substantially below its upper end to define a chamber adapted to confine a bed of solid material within the upper section of said vessel, a plurality of spaced conduits depending from said partition and terminating a fixed interval therebelow for flow of solid material from said chamber to the intermediate section of the vessel therebelow, said conduits also providing a gas space therebetween and below said partition, a second plurality of spaced conduits extending upwardly from said second partition to a level above the solid material inlet level to said vessel, said conduits providing means to uniformly withdraw gas from the upper end of said gas space, a second partition supported across said vessel within the lower section thereof a substantial distance above the bottom thereof, a plurality of spaced conduits depending from said partition and terminating a fixed distance above the lower end of said vessel, said conduits also providing a gas space below the partition, baffle members within the lower section of said vessel near the bottom thereof to provide uniform flow of solid material from the entire vessel cross-section to said solid withdrawal means, means to uniformly introduce gas into the lower section of said vessel above said baffle means and about 1 to 3 feet below the lower ends of said conduits which depend from said last named partition, a plurality of uniformly distributed gas inlets to said vessel at a level below said last named partition and above the lower ends of the conduits depending thereform.

14. An apparatus according to claim 13 characterized in that said means to introduce gas into said vessel below said lower gas space comprises: a plurality of closed spaced conduits extending horizontally within said vessel, each of said conduits having a plurality of holes arranged at spaced intervals through the underside thereof, baffle plates depending downwardly from each of said conduits at spaced intervals between said holes, said plates extending in a plane perpendicular to the axis of said conduits and being of sufficient size to substantially block the channeling of gas along the underside of each of said conduits and manifold means to introduce gas to said conduits.

JOHN W. PAYNE.
ERIC V. BERGSTROM.

REFERENCES CITED

The following references are of record in the file of this patent:

UNITED STATES PATENTS

| Number | Name | Date |
|---|---|---|
| Re. 22,196 | Heard | Oct. 6, 1930 |
| 1,573,533 | Barr | Feb. 16, 1926 |
| 1,775,640 | Griessbach et al. | Sept. 16, 1930 |
| 1,782,244 | Nagel | Nov. 18, 1930 |
| 1,900,859 | Connolly et al. | Mar. 7, 1933 |
| 2,112,643 | Baensch et al. | Mar. 29, 1938 |
| 2,245,664 | Gronert | June 17, 1941 |
| 2,353,552 | Drennan | July 11, 1944 |
| 2,410,309 | Simpson et al. | Oct. 29, 1946 |
| 2,429,545 | Bergstrom et al. | Oct. 21, 1947 |
| 2,437,899 | Welty | Mar. 16, 1948 |

Certificate of Correction

Patent No. 2,509,014                                                                       May 23, 1950

JOHN W. PAYNE ET AL.

It is hereby certified that errors appear in the printed specification of the above numbered patent requiring correction as follows:

Column 11, lines 70 and 71, strike out the words "initially existing at a temperature of at least about 250° F." and insert the same after "catalyst" in line 73; column 16, line 18, strike out the word "second" and insert the same before "conduits" in line 19;

and that the said Letters Patent should be read with these corrections therein that the same may conform to the record of the case in the Patent Office.

Signed and sealed this 19th day of September, A. D. 1950.

[SEAL]

THOMAS F. MURPHY,
                                                                                         *Assistant Commissioner of Patents.*